S. H. CAMPBELL.
PIPE HOLDER.
APPLICATION FILED MAR. 17, 1913.

1,122,854.

Patented Dec. 29, 1914

WITNESSES:
Chas. A. Becker
W. A. Alexander

INVENTOR:
S. H. Campbell,
BY
E. E. Huffman
ATTORNEY

UNITED STATES PATENT OFFICE.

STERLING H. CAMPBELL, OF ST. LOUIS, MISSOURI, ASSIGNOR TO RAILWAY DEVICES COMPANY, OF ST. LOUIS, MISSOURI, A CORPORATION OF MISSOURI.

PIPE-HOLDER.

1,122,854.

Specification of Letters Patent.

Patented Dec. 29, 1914.

Application filed March 17, 1913. Serial No. 754,764.

*To all whom it may concern:*

Be it known that I, STERLING HOUSER CAMPBELL, a citizen of the United States of America, residing at the city of St. Louis, State of Missouri, have invented a certain new and useful Pipe-Holder, of which the following is such a full, clear, and exact description as will enable any one skilled in the art to which it appertains to make and use the same, reference being had to the accompanying drawings, forming part of this specification.

The object of my invention is to produce a pipe holder which, while simple in construction, will firmly and rigidly hold the pipe.

Figure 1:
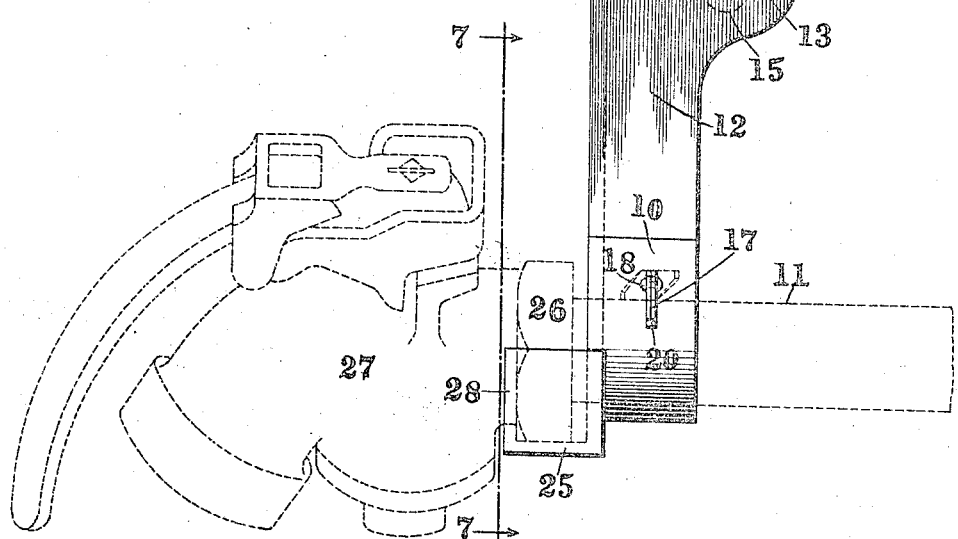
Figure 2:
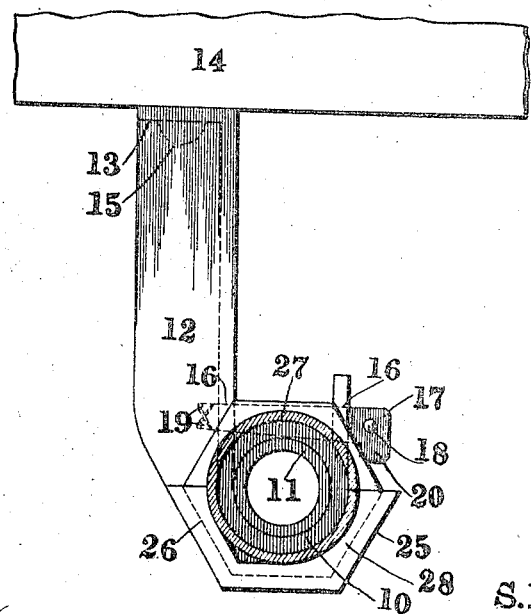

In the accompanying drawings, which illustrate one form of pipe holder made in accordance with my invention, Figure 1 is a side elevation; and Fig. 2 is a section on the line 7—7 of Fig. 1.

Like marks of reference refer to similar parts in both views of the drawings.

10 represents a loop of the proper size and form to receive the pipe 11 which is to be held. In order to secure the loop 10 in position, one side of the loop is provided with an extension 12 having an overturned part 13 adapted to be secured to a suitable support 14 by means of lag screws 15.

Formed in the sides of the loop 10 are openings 16 through which passes a tapered key 17, the edge of which is adapted to bear upon the pipe 11 and thus firmly clamp the pipe in position. The key 17 is formed of two strips of sheet metal secured together by means of a rivet 18. At the end of the key opposite the rivet 18, the strips are each beveled, the bevels being arranged in opposite directions so as to form a notch in the end of the key to permit of the insertion of a tool for separating the ends so as to prevent the accidental withdrawal of the key from the slots. At the opposite end, the key is provided with a lateral extension 20 which serves as a head upon which a tool may operate to withdraw the key from its locking position. In order to secure the pipe in position, it is merely necessary to drive the tapered pin firmly against the pipe and then bend over the ends of the key. The loop 10 also carries an angular housing 25 and is provided with a flange 28 which bears upon the front end of the hexagonal head 26 and thus prevents the forward movement of the angle cock 27. When it is desired to release the pipe, the ends of the key 27 are bent together and the key is removed by the insertion of a tool beneath the head 20.

While my pipe holder is extremely simple in construction, owing to the wedge action of the tapered key 17, it holds the pipe firmly both against longitudinal movement and against rotation.

Having fully described my invention, what I claim as new and desire to secure by Letters-Patent of the United States is:

In a pipe holder, the combination with a member having a loop adapted to receive the pipe, of a tapered key passing through the sides of said loop and bearing upon the pipe therein, and an angular housing carried by said loop and adapted to receive the head of an angle cock, said loop and housing being open at their upper side, whereby the angle cock and pipe may be inserted in position by movement in a vertical direction only when the key is removed.

In testimony whereof, I have hereunto set my hand and affixed my seal in the presence of the two subscribing witnesses.

STERLING H. CAMPBELL. [L. S.]

Witnesses:
W. A. ALEXANDER,
G. M. SHORE.